(12) United States Patent
Herbst et al.

(10) Patent No.: US 9,573,105 B2
(45) Date of Patent: Feb. 21, 2017

(54) LOADING DEVICE

(71) Applicant: THYSSENKRUPP UHDE GMBH, Dortmund (DE)

(72) Inventors: Julian Herbst, Bochum (DE); Lutz Oliver Porz, Dortmund (DE); Reinhard Michel, Bochum (DE); Joachim Johanning, Oberhausen (DE); Günter Völker, Münster (DE); Michele Marigo, Durham (GB); Peter Renvoice, Middlesbrough (GB)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 0 days.

(21) Appl. No.: 14/427,206

(22) PCT Filed: Sep. 3, 2013

(86) PCT No.: PCT/EP2013/068180
§ 371 (c)(1),
(2) Date: Mar. 10, 2015

(87) PCT Pub. No.: WO2014/037346
PCT Pub. Date: Mar. 13, 2014

(65) Prior Publication Data
US 2015/0246334 A1    Sep. 3, 2015

(30) Foreign Application Priority Data
Sep. 10, 2012 (DE) .................. 10 2012 017 785

(51) Int. Cl.
*B01J 8/00* (2006.01)
*B65B 3/26* (2006.01)
(Continued)

(52) U.S. Cl.
CPC ............... *B01J 8/0015* (2013.01); *B01J 8/002* (2013.01); *B01J 8/003* (2013.01); *B01J 8/0214* (2013.01);
(Continued)

(58) Field of Classification Search
CPC .............. B01J 2208/00752; B01J 2208/00778; B01J 8/0015; B01J 8/002; B01J 8/003; B01J 8/0214; B65B 3/26; C01C 1/0411
(Continued)

(56) References Cited

U.S. PATENT DOCUMENTS 4,433,707 A * 2/1984 Farnham .................. B01J 8/003
141/1
4,994,424 A * 2/1991 Leib ....................... B01J 8/0015
208/113
(Continued)

FOREIGN PATENT DOCUMENTS

DE      19634455 A1    3/1998
EP      1152967 B1     4/2004
(Continued)

OTHER PUBLICATIONS

German Language International Search Report for International patent application No. PCT/EP2013/068180; mailing date Dec. 12, 2013.
(Continued)

*Primary Examiner* — Timothy L Maust
*Assistant Examiner* — Andrew Schmid
(74) *Attorney, Agent, or Firm* — thyssenkrupp North America, Inc.

(57) ABSTRACT

The invention relates to a loading device having N loading heads offset by N/360°, wherein N is the number 3 or an integer multiple thereof, wherein each of the N loading
(Continued)

heads has a connecting device for a hose arranged at the upper end, through which hose the catalyst material can be delivered from above, wherein each of the N loading heads has a deflecting cone with the tip pointing upwards beneath the connecting device and joined to the connecting device, a vertical holder is mounted on the underside of said deflecting cone, at least two circular deflector funnel elements are mounted on the vertical holder by means of horizontal braces, the deflector funnel elements open more narrowly at the top than at the bottom, gaps are provided between the deflector funnel elements and the lower deflector funnel elements have a larger diameter than the deflector funnel elements above them.

15 Claims, 2 Drawing Sheets

(51) Int. Cl.
*B01J 8/02* (2006.01)
*C01C 1/04* (2006.01)
(52) U.S. Cl.
CPC ............... *B65B 3/26* (2013.01); *C01C 1/0411* (2013.01); *B01J 2208/00752* (2013.01); *B01J 2208/00778* (2013.01)

(58) Field of Classification Search
USPC .................... 141/5, 7, 11, 12, 59, 65, 69–74, 78–82,141/100, 144, 239, 286, 331
See application file for complete search history.

(56) References Cited

U.S. PATENT DOCUMENTS

| | | |
|---|---|---|
| 5,687,780 A | 11/1997 | Minami |
| 5,819,820 A | 10/1998 | Lehman |
| 7,588,061 B2 | 9/2009 | Poussin |
| 2009/0224208 A1* | 9/2009 | Wodberg ................ F23C 6/047 252/373 |
| 2010/0019952 A1 | 1/2010 | Poussin |

FOREIGN PATENT DOCUMENTS

| | | | |
|---|---|---|---|
| EP | 1687223 B1 | 5/2008 | |
| GB | 2287016 A * | 9/1995 | ............. B01J 8/002 |
| WO | 0043304 A1 | 7/2000 | |

OTHER PUBLICATIONS

English Translation of International Search Report for International patent application No. PCT/EP2013/068180; mailing date Dec. 12, 2013.
English language abstract of DE 19634455 (A1).

* cited by examiner

LOADING DEVICE

CROSS REFERENCE TO RELATED APPLICATIONS

This application is a U.S. National Stage Entry of International Patent Application Serial Number PCT/EP2013/068180, filed Sep. 3, 2013, which claims priority to German patent application no. DE 102012017785.2 filed Sep. 10, 2012, the entire contents of both of which are incorporated herein by reference.

FIELD

The present invention relates to a method for filling ammonia synthesis reactors and the filling devices that are used for this purpose.

BACKGROUND

Typically, for the production of ammonia in synthesis plants that operate in accordance with the Haber-Bosch process, use is made of ammonia reactors which, depending on the synthesis concept, contain up to three catalyst beds. The reactors consist of cylindrical pressure vessels and comparatively complicated internal constructions, the converter inserts, for receiving the catalyst beds and optionally heat exchangers. On account of the high pressure level of the synthesis of usually more than 200 bar, the diameters of the pressure vessels are kept as small as possible and the catalyst beds are arranged one beneath another along the container vessel axes. This arrangement has the consequence that the accessibility of the catalyst beds that are further away from the apparatus cover is highly restricted and filling with the catalyst material is rendered more difficult.

As a result of the different plant capacities and process engineering conditions, the catalyst beds have very different dimensions. On account of the efficiency with regard to the overall size and the pressure loss, the radial type of construction prevails nowadays, i.e. the catalyst beds are in the form of hollow cylinders and are flowed through in the radial direction.

In the case of continuous "hose loading", as it is known, in which the reactor beds are filled with catalyst via one or more hoses, only average bulk densities that are beneath the required value for the synthesis reaction are achieved. Therefore, the catalyst beds have hitherto been filled using the batchwise stratified loading method, that is to say catalyst layers of 250-300 mm are introduced using a hose and subsequently compacted, by means of concrete vibrators and other vibrators, to the required bulk density of at least 2.8 kg/l of oxidized catalyst, or 2.3 kg/l in the case of pre-reduced, that is to say specifically lighter catalysts. The vibration of a layer can take more than an hour depending on the bed geometry.

This procedure is acceptable when new plants are filled for the first time, since the operations take place during preparation for start-up and are not on the time-critical path, that is to say do not result in expensive production stoppages.

However, during a catalyst change, the catalyst-changing operations usually take place on the time-critical path and can be decisive for the length of the downtime. For conventional catalyst-containing vessels, it is conventional in such cases to use the "dense loading" method, as it is known, to effect the desired bulk density in a continuous loading method without an interposed compaction step, and in this case the catalyst can be introduced in a correspondingly quicker manner.

In terms of phenomena, the difference in the achievable bulk densities between hose loading and dense loading can be explained in that during hose loading a large number of particles drop onto a small area in a short period of time, wherein the particles obstruct one another in the event of arrangement in a dense packing structure, whereas in dense loading a large number of particles drop onto a larger area in a short period of time, with the result that the particles have enough space and time to be arranged in a denser packing structure.

A large number of systems and methods for dense loading are known from the prior art. For example, US 2010/0019952 A1 describes, in which a rotating distribution system is arranged in the top of a catalyst vessel, said system distributing the dropping catalyst particles uniformly over the cross section of the reactor area, wherein the distribution system is fixed at the top. EP 1 152 967 B1 describes a similar system in which the speed of rotation of the rotating distribution system is adapted such that, as the level of the bed increases, the particles can still be thrown into the outer region of the bed without, however, striking the vessel wall.

U.S. Pat. No. 5,687,780 describes a system in which a rotating distribution system is likewise arranged in the top part of a catalyst vessel, said system distributing the dropping catalyst particles uniformly over the cross section of the reactor area, wherein the system can be displaced axially, however, thereby reducing the dropping height of the particles. EP 1 687 223 B1 describes such a system, which additionally operates with gas jets which drive the rotating distribution system and also influence the paths of the particles.

GB 2 287 016 A describes a system which is likewise arranged in the top of a catalyst vessel, said system distributing the dropping catalyst particles uniformly over the cross section of the reactor area, and in which the system can also be lowered and positioned in the reactor. The system is not rotatable and has vanes which project at different angles and which effect the uniform distribution of the particles.

These mentioned dense loading systems and also all further dense loading systems that are known from the prior art are not usable in ammonia synthesis reactors which are flowed through radially, since there is no top-side access and neither are the reactors which are flowed through radially able to be filled at all centrally along their axis of symmetry, since they are bounded on both sides in the radial direction by grid structures. Design details further constrict the clearances within the beds and thus impede accessibility for the loading systems. At the same time, specifically in reactors which are flowed through radially, it is particularly important for the particles not to be able to slip down during operation, since otherwise short-circuit currents would arise in the upper region of the radial bed.

SUMMARY

Therefore, the invention is based on the object of providing a structurally simple device in which the above-described disadvantages do not occur, and with which the method of catalyst dense loading can be carried out in as short a time as possible in a reactor having one or more catalyst beds which are flowed through radially.

BRIEF DESCRIPTION OF THE DRAWINGS

The present disclosure is described in detail below with reference to the attached drawing figure, wherein.

DETAILED DESCRIPTION

Disclosed herein is a loading device,
having N loading heads that are offset through N/360°, wherein N is the number 3 or an integral multiple thereof,
wherein each of the N loading heads has a connection device, arranged at the upper end, for a hose via which catalyst material can be conveyed from above,
wherein each of the N loading heads has, beneath the connection device, a deflecting cone of which the tip is directed upward and which is connected to the connection device,
a vertical holding device is fastened to the underside of this deflecting cone,
at least 2 circular deflecting funnel elements are fastened to the vertical holding device by means of horizontal struts,
the deflecting funnel elements open more narrowly at the top than at the bottom,
gaps are provided between the deflecting funnel elements,
and the lower deflecting funnel elements have a larger diameter than the deflecting funnel elements located thereabove.

In a preferred embodiment of the invention, the deflecting cone and deflecting funnel elements are arranged such that they are in contact with an envelope surface which has a circular cone with an opening angle of 45° to 90°, particularly preferably 60°.

In a further configuration of the invention, in each case exactly three deflecting funnel elements are arranged one beneath another.

In a further configuration of the invention, three loading heads are fixed to a loading ring in a manner offset through 120°. Said loading ring is preferably arranged so as to be rotatable about the reactor axis. In a preferred configuration, this loading ring is vertically displaceable and has a releasable locking mechanism in the reactor, said locking mechanism making it possible to leave said loading ring in the reactor during operation.

The object of the invention is also achieved by a loading method, wherein the loading heads are pivoted tangentially back and forth sectionally on a circular path, as seen from above, during loading.

In one configuration of the method, provision is made for the loading heads to be lowered to a level just above the catalyst bed and then moved axially upward in accordance with the filling level.

In one configuration of the method, provision is made for the tangential pivoting movements and the axial upward movement to be controlled and carried out by the movement of the loading ring.

The present disclosure is further explained in more detail below with reference to the two drawing figures.

Figure 1:
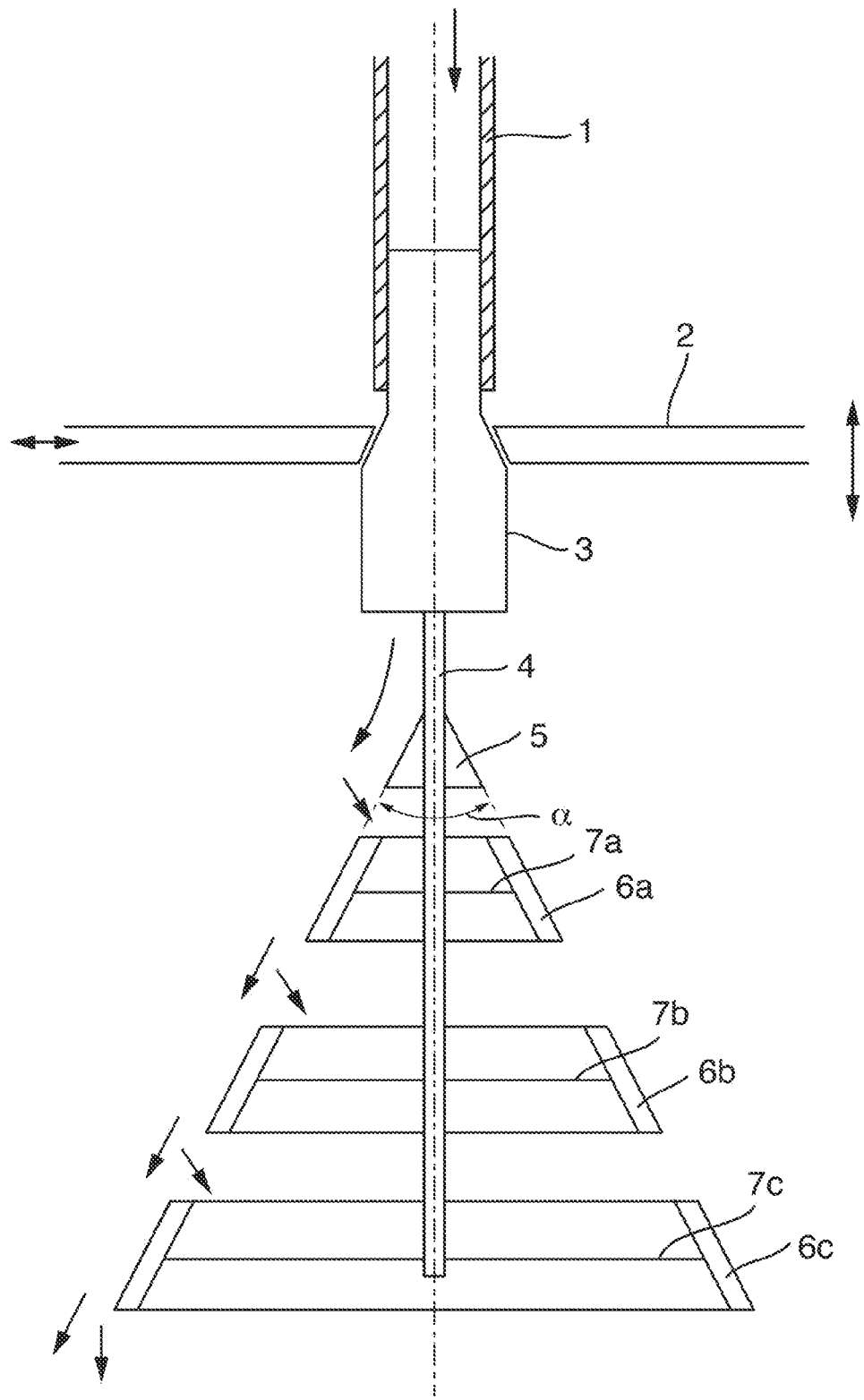
FIG. 1 is a side cross sectional view of an embodiment of a loading head of the present disclosure.

FIG. 1 shows a hose 1, in which the catalyst material is conveyed, wherein pneumatic conveying or gravity conveying are possible. The hose 1 is fastened to the connection device 3, which is also connected to the loading ring 2. Also fastened to the connection device 3 is the holding device 4, which carries the deflecting cone 5 and also the three deflecting funnel elements 6a, 6b and 6c by means of the holding bars 7a, 7b and 7c. The deflecting cone and deflecting funnel elements have an opening angle α (alpha). The arrows at the deflecting funnel indicate the direction of flow of the catalyst particles, and the arrows at the loading ring 2 indicate the directions of movement.

Figure 2:
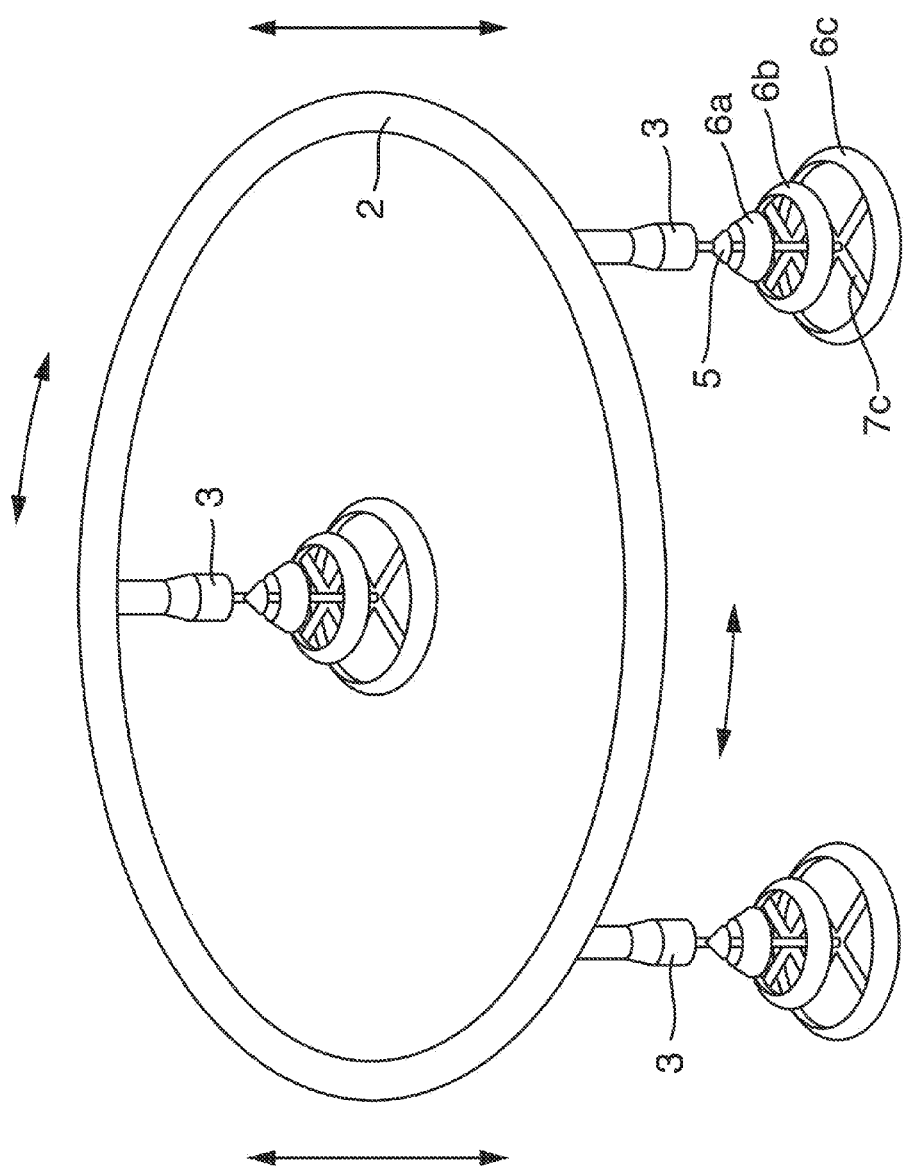
FIG. 2 is a perspective view of an embodiment of a loading ring having three loading heads, as disclosed herein.

FIG. 2 shows an oblique illustration with the loading ring 2 and three loading heads, the reference numerals of which correspond to those in FIG. 1.

The invention claimed is:

1. A loading device for loading catalyst material into a reactor, comprising:
    a plurality of loading heads each configured to be coupled to a catalyst material supply hose, each loading head including,
        a connection device disposed at an upper end of said loading head and configured to be coupled to the catalyst material supply hose,
        a deflecting cone disposed below said connection device and coupled thereto at an upwardly directed tip of said deflecting cone,
        a vertical holding device coupled to an underside of said deflecting cone,
        a plurality of horizontal struts coupled to said vertical holding device,
        a first circular deflecting funnel element coupled to said horizontal struts and having an upper opening and an opposing lower opening defined therein, wherein the upper opening is smaller in area than the opposing lower opening,
        a second circular deflecting funnel element disposed below and spaced vertically apart from said first deflecting funnel element so as to define a gap there between, said second circular deflecting funnel coupled to said horizontal struts and having an upper opening and an opposing lower opening defined therein, wherein the upper opening is smaller in area than the respective opposing lower opening, said second deflecting funnel element having a larger diameter than that of said first deflecting funnel; and
    a loading ring coupled to the plurality of loading heads.

2. The loading device of claim 1, wherein said plurality of loading heads are a plurality of N loading heads and are angularly offset from each other about the central axis of rotation by an angle of 360°/N, wherein N is an integer.

3. The loading device of claim 1, wherein an outer surface of each of said deflecting cone and said first and second deflecting funnel elements together define a circular conical deflector envelope having an opening angle of between of 450 to 900.

4. The loading device of claim 1, further comprising a third circular deflecting element disposed below and spaced vertically apart from said second deflecting funnel element so as to define a gap there between, said third circular deflecting funnel coupled to said horizontal struts and having an upper opening and an opposing lower opening defined therein, wherein the upper opening is smaller in area than the respective opposing lower opening, said third deflecting funnel element having a larger diameter than that of said second deflecting funnel.

5. The loading device of claim 2, wherein N equals three and the loading ring is coupled to the plurality of three loading heads, wherein each of said three loading heads is angularly offset from each other about a central axis of said ring.

6. The loading device of claim 2, wherein said loading ring is configured to be rotatable about an axis of the reactor.

7. The loading device of claim 5, wherein said loading ring is vertically displaceable.

8. The loading device of claim 5, wherein said loading ring includes a releasable locking mechanism disposed thereon and configured to permit said loading ring to remain inside said reactor during operation of the reactor.

9. A method of loading a catalyst into a reactor, comprising:
   providing a loading device of claim 1;
   dispersing catalyst from the loading heads of the loading mechanism into the reactor;
   tangentially pivoting the loading heads back and forth sectionally on a circular path, when viewed from above the loading mechanism, during said dispersing step.

10. The method of claim 9, further comprising:
    lowering the loading heads such that they are disposed a predefined distance immediately above a catalyst bed in the reactor;
    moving the loading heads axially upward at substantially the same rate as a catalyst bed filling rate, so as to maintain substantially the same distance between a top surface of the catalyst bed and the loading heads as the catalyst bed fills up.

11. The method of claim 10, wherein said steps of tangentially pivoting and moving the loading heads axially upward are performed by complementary movements of the loading ring.

12. The loading device of claim 2 wherein N is at least an integral multiple of three.

13. A loading device for loading catalyst material into a reactor, the loading device comprising:
    loading heads configured to be coupled to a catalyst material supply hose, wherein each loading head includes
       a connection device disposed towards an upper end of the loading head and configured to be coupled to the catalyst material supply hose,
       a deflecting cone disposed below the connection device and coupled thereto,
       a vertical holding device coupled to the deflecting cone,
       a plurality of horizontal struts coupled to the vertical holding device,
       a first circular deflecting funnel element coupled to the horizontal struts and having an upper opening and an opposing lower opening defined therein, wherein the upper opening is smaller in area than the opposing lower opening,
       a second circular deflecting funnel element disposed below and spaced vertically apart from the first deflecting funnel element so as to define a gap there between, the second circular deflecting funnel coupled to the horizontal struts and having an upper opening and an opposing lower opening defined therein, wherein the upper opening is smaller in area than the respective opposing lower opening, the second deflecting funnel element having a larger diameter than a diameter of the first deflecting funnel; and
    a loading ring coupled to the plurality of loading heads.

14. The loading device of claim 13 wherein the loading ring is configured to be rotatable about an axis of the reactor.

15. The loading device of claim 14 wherein the loading heads are angularly offset from each other about a central axis of rotation.

* * * * *

UNITED STATES PATENT AND TRADEMARK OFFICE
CERTIFICATE OF CORRECTION

PATENT NO. : 9,573,105 B2  
APPLICATION NO. : 14/427206  
DATED : February 21, 2017  
INVENTOR(S) : Julian Herbst et al.

Page 1 of 1

It is certified that error appears in the above-identified patent and that said Letters Patent is hereby corrected as shown below:

On the Title Page

Item (71) "Applicant:":  
Please delete "THYSSENKRUPP UHDE GMBH, Dortmund (DE)" as the listed Applicant, and add in its place "THYSSENKRUPP INDUSTRIAL SOLUTIONS AG, Essen (DE)".

Signed and Sealed this  
Second Day of May, 2017

Michelle K. Lee  
*Director of the United States Patent and Trademark Office*